(12) United States Patent
Mosek

(10) Patent No.: US 7,523,140 B2
(45) Date of Patent: Apr. 21, 2009

(54) FILE SYSTEM THAT MANAGES FILES ACCORDING TO CONTENT

(75) Inventor: Amir Mosek, Tel Aviv (IL)

(73) Assignee: Sandisk IL Ltd., Kfar Saba (IL)

( * ) Notice: Subject to any disclaimer, the term of this patent is extended or adjusted under 35 U.S.C. 154(b) by 426 days.

(21) Appl. No.: 10/849,234

(22) Filed: May 20, 2004

(65) Prior Publication Data

US 2005/0193025 A1 Sep. 1, 2005

Related U.S. Application Data

(60) Provisional application No. 60/549,891, filed on Mar. 1, 2004.

(51) Int. Cl.
*G06F 17/00* (2006.01)
*G06F 13/42* (2006.01)

(52) U.S. Cl. ...................... 707/200; 710/105

(58) Field of Classification Search ............... 707/1, 707/2, 104.1, 200, 206; 710/105; 709/230–232
See application file for complete search history.

(56) References Cited

U.S. PATENT DOCUMENTS

| 5,930,828 | A | | 7/1999 | Jensen et al. |
| 5,933,835 | A | * | 8/1999 | Adams et al. ............ 707/104.1 |
| 6,487,663 | B1 | | 11/2002 | Jaisimha |
| 6,658,464 | B2 | * | 12/2003 | Reisman ..................... 709/219 |
| 6,668,336 | B2 | | 12/2003 | Lasser |
| 2002/0138593 | A1 | * | 9/2002 | Novak et al. ................ 709/219 |
| 2003/0061370 | A1 | * | 3/2003 | Nakayama et al. .......... 709/231 |

FOREIGN PATENT DOCUMENTS

| WO | WO98/12638 | 3/1998 |
| WO | WO03/044686 | 5/2003 |

OTHER PUBLICATIONS

Childs "Filing system interfaces to support multimedia applications", Proceedings of the 8th ACM SIGOPS European workshop on Support for composing distributed applications, 1998, pp. 162-169.*
Ferrer et al, "GIFT: A Multiple Gateway for File Transfer, Access, and Management", IEEE 1990, pp. 99-106.*
U.S. Appl. No. 10/397,378, filed Mar. 27, 2003, Ban et al.

* cited by examiner

*Primary Examiner*—Uyen T. Le
(74) *Attorney, Agent, or Firm*—Mark M. Friedman

(57) ABSTRACT

A method of managing a plurality of files according to their respective instances of a property of the files, a data processing device that uses the method, and a computer readable storage medium bearing code for implementing the method. The files of at least one of the instances are managed according to a management protocol respective to that/those instance(s). Preferably, all the other files are managed according to a common default management protocol. Different protocols trade off performance vs. ruggedness, trade off average performance vs. latency, or include different defragmentation policies.

22 Claims, 3 Drawing Sheets

FILE SYSTEM THAT MANAGES FILES ACCORDING TO CONTENT

This is a continuation-in-part of U.S. Provisional Patent Application No. 60/549,891, filed Mar. 1, 2004

FIELD AND BACKGROUND OF THE INVENTION

The present invention relates to file systems and, more particularly, to a file system that manages files according to the respective content of the files.

Almost all computer systems, whether large mainframes or tiny embedded micro controllers, need to store data such that the data shall not be lost when the system is powered down. Therefore those computers usually include some kind of Non Volatile Memory (NVM), in addition to any volatile memory they may use for running their programs. The NVM may be a magnetic disk, a flash memory chip, or any other non-volatile storage element.

FIG. 1 shows the general structure of how such a storage device is accessed. At the bottom of the figure is a physical storage medium 10, which is the hardware layer implementing the physical storage. As each storage device may have its own unique interface and peculiarities which make it very inconvenient to work with, it is the common practice to have a software device driver 12 included in the operating system running on the computer (or running on the bare hardware, if no operating system is used), with this device driver 12 providing a simplified and standardized interface for other software components wishing to access the device. For storage devices 10 used for storing files (i.e. disks, diskettes, etc.), but not only for them, the interface provided by their device drivers 12 is usually of the type known as "block device driver". Such device drivers 12 interact with their clients using blocks of data rather than single bytes. This applies to both input and output operations, that is, to both reading and writing. The most common example of a block device 10 is the magnetic disk, whose hardware interface is commonly configured for transferring only complete blocks (usually called "sectors" in this context), such as 512 bytes or more. It should be emphasized that it is not necessary for physical storage device 10 to be physically limited to block operations in order to have a device driver 12 presenting a block device interface. For example, a battery-backed RAM disk is not physically limited to blocks and may physically read and write each of its memory bytes. Still, typically its device driver 12 presents a block device interface to the rest of the system, so as to be compatible and interchangeable with magnetic disks. Therefore, for the purpose of the present invention, a block device is any device whose driver 12 presents a block device interface, regardless of its actual physical structure.

A block device seems to its users as a linear array of blocks of a certain fixed size. Each one of these blocks can be read or written independently of the other blocks using its index in the array, as shown in FIG. 2. The common practice (which is also used here) is to number the blocks starting from block number 0 (21), and ending in block number (N−1) 22, where N is the number of blocks exported by device driver 12. Again it should be emphasized that this linear array structure does not necessarily exist at the physical device level. For example, a flash disk block device driver 12 also presents this linear array image, but internally the physical blocks on a flash medium 10 are usually scattered in a random order (such that block number 0 may physically be located in the middle or the end of flash medium 10) due to the writing limitations in flash memory and the possible existence of bad blocks. It should also be understood that block device driver 12 has no knowledge of the contents put into its blocks by the upper software layers 14 and 16.

Referring again to FIG. 1, it is seen that there is usually a File System (FS) software layer 14 on top of device driver 12. A FS 14 is a software component which provides further insulation from physical device 10, by enabling the application programs 16 to interact with storage device 10 using only the concept of files, a concept which is much more natural and convenient to the typical programmer or user. FS 14 achieves this abstraction by organizing the user data on block device 10 into some logical structure, and associating the blocks containing a file's data with the file's attributes (i.e. file name, creation time, access permissions, etc.). For that purpose FS 14 stores into device 10 meta-data, which are not directly visible to the user, and which include the FS 14 internal book-keeping information with which FS 14 is able to trace and access the user files. For example, the Microsoft DOS FAT12 file system, which is one of the simplest FS commercially available, stores on storage device 10 a boot sector containing some basic parameters, allowing the location of the other meta-data structures (which must be in the first block of device 10), one or more copies of the File Allocation Table (FAT), which is the allocation map of device 10, and a root directory structure for locating files by name. Application programs 16 interact with FS 14 on the file-level, by issuing commands such as "open file", "delete file", "write file", etc. Application programs 16 thus are completely ignorant of the underlying block structure. There are many file systems 14 in use today, greatly differing in their internal structures and characteristics. In many cases (such as with the Linux operating system) an operating system even provides several file systems 14 to its users and they may choose the one most suitable for their needs.

Exactly as a storage device driver 12 uses no knowledge about the content and use of the data stored in the sectors it is handling and all such sectors are treated the same, so also every prior art file system 14 uses no knowledge about the content and use of the data stored in the files it is handling and all such files are treated the same. It should be noted that, unlike a driver 12, a file system 14 does have access to some knowledge about the data. For example, it is the common practice that files containing compressed still digital pictures (such as those generated by still digital cameras) have an extension to their names identifying the fact they contain pictures and also the type of compression used. For example one such file can be called "My_Son.jpg", indicating to the users this a "JPEG"-type picture file. Another file might be called "Agreement.txt", indicating it contains text generated by some word processing program. As file system 14 "knows" the names of the files it is handling, it thus in many cases also "knows" what are the types of those files. However, as noted above, no prior art file system 14 makes any use of such knowledge.

It next will be explained why there is a benefit for file system 14 to make use of such knowledge. One must understand that the algorithms employed by a file system when handling a file (i.e. writing or updating the file) involve trade-offs between several desirable characteristics, and the designer of file system 14 must make choices here.

As a first example consider the trade-off between performance and ruggedness. When writing new files or when updating existing files with new data, it is highly desirable that the operation be completed as quickly as possible. This is especially important in real-time systems where the operation must be completed before additional events take place. However, it is also usually desirable that the system be resistant to sudden power loss in the sense that data written prior to the power loss will not be lost. See for example U.S. Pat. No. 6,668,336 which discusses these issues at length. It is a well-known fact that performance and ruggedness are contradictory requirements, and one can be improved at the cost of the other. For example, in a Microsoft FAT file system (like the one used by the DOS operating system and by many Microsoft Windows operating systems) when a file is updated by extending it, the length of the file is recorded in the file's directory entry only at the end of the process, when the file is closed by the user (indicating there is no more data to write). This decision of the FAT file system designer is understandable when one considers that the alternative would be to update the file's directory with the current length whenever the space allocated to the file is increased. In a large file of a few megabytes this could mean thousands of directory update operations, a load that would certainly impact performance. However, by giving up those directory updates the designer gave up a bit in the ruggedness of the file system. For if now the power is lost in the middle of writing a long file but after already writing a lot of data, the directory entry of the file will show it to be much shorter, and eventually (after running file system recovery tools such as Microsoft's ScanDisk) the file will be truncated to the length recorded in the directory, with all the data written beyond this length being lost forever. (See also U.S. patent application Ser. No. 10/397,378, filed Mar. 27, 2003, and published as US patent application publication no. 2004/0193564, which suggests a method that, for this specific conflict between performance and ruggedness, provides both. However, this case is presented only as an example of the trade-offs involved, and anyhow most file systems do not employ the methods of U.S. Ser. No. 10/397, 378).

As a second example consider the trade-off between average performance and maximum latency. A software application 16 might require the recording into storage of a long stream of incoming data. This can be the case in audio-streaming or video-streaming applications. In such case a certain packet of data (say 10 Kbytes) is received per each fixed time slot (say 10 milliseconds), and the cycle of receiving and storing is repeated continuously many times with no break between the packets. It is obvious that file system 14 must be capable of writing data at an average rate of at least 1 Megabyte per second, or otherwise the system will not be able to keep with the flow of incoming data. However, this is not always enough—there might also be a requirement that the handling of one packet must be completed before the arrival of the next. The time for a call to file system 14 to complete is called "latency", and so the above requirement can be stated as "the maximum latency for writing any 10 KB packet must be less than 10 milliseconds". In such case there might be a trade-off between the requirements of average performance and maximum latency.

To see why this might be the case, consider, for example, flash memory storage systems 10. Such systems 10 require old and superseded data blocks to be recycled by erasing them prior to having them ready for another use. The erasing operation is relatively slow—a few milliseconds for NAND flash and a few hundreds of milliseconds for NOR flash. It is easy to realize there might be conflicting considerations in deciding when and how to do such block recycling—grouping many old blocks to be recycled together may provide more efficient flash management and therefore better average performance, but on the other hand will create a "pause" in the system's response and might violate the maximum latency requirement.

Having understood that there are such design trade-offs in file systems 14, one should understand why different types of files are better off with the trade-offs decided in different ways. For example, a cellular smart phone supporting both video streaming over the air and word processing capabilities has different needs for the files created by those two applications. For the video files the average write performance is of no real importance (as long as it is not terribly slow)—the average data rate is anyway limited by the bandwidth of the cellular channel which is usually much lower than the performance of the file system. However, the maximum latency requirement cannot be compromised for such application—a packet that cannot be accepted by file system 14 on its arrival (for example because file system 14 is doing a 100 millisecond recycling operation) might be lost forever. For a word processing file on the other hand, write performance is important. A user having to wait for a few seconds when saving a large document file might get frustrated.

Another example can be given for ruggedness. A device designer may decide to adopt a policy that forces the user to explicitly close a file in order to guarantee it is fully and safely saved. Until the user explicitly indicates s/he had finished updating the file, the new file data may reside in a RAM buffer and not be safe from a power loss. However, when downloading an upgrade for the operating system of the device, such a policy can be disastrous, rendering the device totally unusable if a power loss unexpectedly occurs. So when deciding on the performance vs. ruggedness trade-off, it would be beneficial to have executable files treated with one policy and data files with another policy.

Designers of prior art file systems 14 were aware of the considerations discussed above. For this reason one can find prior art file systems 14 that were optimized for certain applications and where the trade-offs were decided accordingly. For example, some file systems 14 are designed for hand-held portable devices such as PDAs or smart phones, where running out of battery power is a very plausible risk. In such cases ruggedness was given high importance over performance—for example RAM buffering of written data is not used, so as not to risk losing the data if the battery runs out of power. In all prior art file systems 14 such policy decisions apply to each and every file, regardless of its type. This is so even though for some file types better and more optimal decisions could be taken. For example, a video streaming file downloaded from an Internet website could greatly benefit from RAM buffering in terms of being able to accept a higher incoming data rate, while the risk of losing the file on power loss is unimportant because it can always be downloaded again from the same source.

There is thus a widely recognized need for, and it would be highly advantageous to have, a file system 14 that manages files in accordance with the contents of the files.

SUMMARY OF THE INVENTION

According to the present invention there is provided a method of managing a plurality of files, including the steps of: (a) selecting a property of the files to use for managing the files; (b) for each of at least one instance of the property, selecting a respective management protocol for each file whose instance of the property is the each instance; and (c) when operating on any one of the files: (i) determining the instance of the property of the any one file, and (ii) if the instance of the property of the any one file has a respective management protocol, applying the respective management protocol to the any one file.

According to the present invention there is provided a data processing device including: (a) a memory for storing a plurality of files, each file having a respective instance of a property of the files; and (b) a file system for managing the files in accordance with the instances, by selecting a respective management protocol for at least one of the instances, all the files of each at least one instance then being managed according to the respective management protocol of the each instance.

According to the present invention there is provided a computer readable storage medium having computer readable code embodied on the computer readable storage medium, the computer readable code for managing a plurality of files according to respective instances of a property of the files, the computer readable code including: (a) program code for selecting a respective management protocol for at least one of the instances; and (b) program code for managing all of the files of each at least one instance according to the respective management protocol of the each instance.

A file system 14 of the present invention manages a plurality of files according to the files' respective instances of a property of the files, using a respective management protocol for files of each of at least one of the instances and, preferably, a default management protocol for all the other files. When operating on a file, file system 14 of the present invention first determines the respective instance of the file's property. If the respective instance of the file's property is associated with a respective management protocol, file system 14 of the present invention applies that respective management protocol to the file. Otherwise, file system 14 of the present invention preferably applies the default management protocol to the file.

In the application for which the present invention is primarily intended, as described below, the relevant file property is the type of the file. Preferably, the instances of "file type" to which respective management protocols are applied include "text", "audio", "picture", "video" and "Web page" (i.e., "World Wide Web browser page"), so that special respective management protocols are applied to text files, audio files, picture files, video files and/or Web page files.

Preferably, the various management protocols of the present invention include different tradeoffs between performance and ruggedness. For example, ruggedness is emphasized for executable files and performance is emphasized for data files.

The term "performance" is understood herein to refer to the rate at which data is read from or written into the storage system, and is typically measured in bytes per second. As read and write speeds of storage systems are usually not equal, read performance is usually different than write performance.

Alternatively, the various management protocols of the present invention include different tradeoffs between average performance and latency. For example, low latency is emphasized for video files, and high average performance is emphasized for text files.

Alternatively, the various management protocols of the present invention include different respective defragmentation policies. Note that the usage of the term "defragmentation" herein is somewhat different than the standard usage of this term. In the present context, "defragmentation" is equivalent to "garbage collection" in the context of managing a non-volatile memory. For example, in the management of a flash memory, "defragmentation" includes recycling flash blocks that store data that is no longer needed and preparing those flash blocks for new writing.

Preferably, the instance of a file's property is determined according to the file's filename extension (e.g., when the property is "file type", .doc for text files, .mp3 for audio files, .jpg for picture files, .html for Web page files). Alternately, the instance of a file's property is determined according to the name of a folder that includes the file.

Preferably, the instance of a file's property is determined in accordance with one or more criteria that are determined at runtime.

A data processing device of the present invention includes a memory such as storage medium 10 for storing a plurality of files, each file having a respective instance of a property (e.g., the type) of the file, and a file system for managing the files in accordance with their instances. A file system of the present invention selects a respective management protocol for all files of at least one of the instances, the files of that/those instance(s) then being managed according to the respective management protocols of that/those instance(s). Preferably, a file system of the present invention manages all the other files according to a common default protocol.

A computer-readable storage device of the present invention had embodied on it computer readable code for managing a plurality of files according to the respective instances of a property (e.g., the type) of the files. The computer readable code includes program code for selecting a respective management protocol for at least one of the instances and program code for managing all the files of that/those instance(s) according to the respective management protocol(s). Preferably, the computer readable code also includes program code for managing all other files according to a common default protocol.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a file system that manages files according to their content.

The principles and operation of a file system according to the present invention may be better understood with reference to the drawings and the accompanying description.

A file system of the present invention optimizes its handling of files by providing different policies (protocols) for different file types. Using the above example of a cellular smart phone, a video streaming file is buffered in RAM while being written, but a text file is not buffered in RAM. As another example, a digital picture file is written with garbage collection (e.g. defragmentation) activities turned off so as to be ready for the next picture as soon us possible, while a word processing text file is written with garbage collection turned on so as to achieve the best average performance.

The determination of a file's type can be made in many ways, including, for example, in the context of a Microsoft Windows® operating system:

a. By predefined file name extension—an extension of "jpg" is taken to mean that the file is a picture file, an extension of "txt" is taken to mean that the file is a text file, an extension of "mpeg" is taken to mean that the file is a video file, etc.

b. By predefined folder (directory) name—all files in the folder called "My Pictures" are taken to be picture files, all files in the folder called "My Documents" are taken to be text files, all files in the folder called "My Videos" are taken to be video files, etc.

c. By runtime configuration using the system's registry—the registry associates the type "picture files" with the file extensions .jpg, .bmp and .ico and with the folder called "My Pictures".

d. By runtime configuration using a configuration file—same association as in the registry example but provided in a configuration text file.

e. By runtime configuration using function calls—same associations as in the registry example but provided by software function calls to the file system, or an association of one specific file with the type "picture files" by a software function call.

The decision of what policy to use for a given file type can be predetermined in advance in the file system software code. Alternatively, the policy is selected by the user. The user may make the selection in many ways, such as through the registry or through a configuration file. The Appendix contains an example of the syntax used for a configuration file that supports the methods of the present invention. The example shows how policy settings applying to defragmentation (garbage collection) are defined by a user through a configuration text file.

Figure 1:
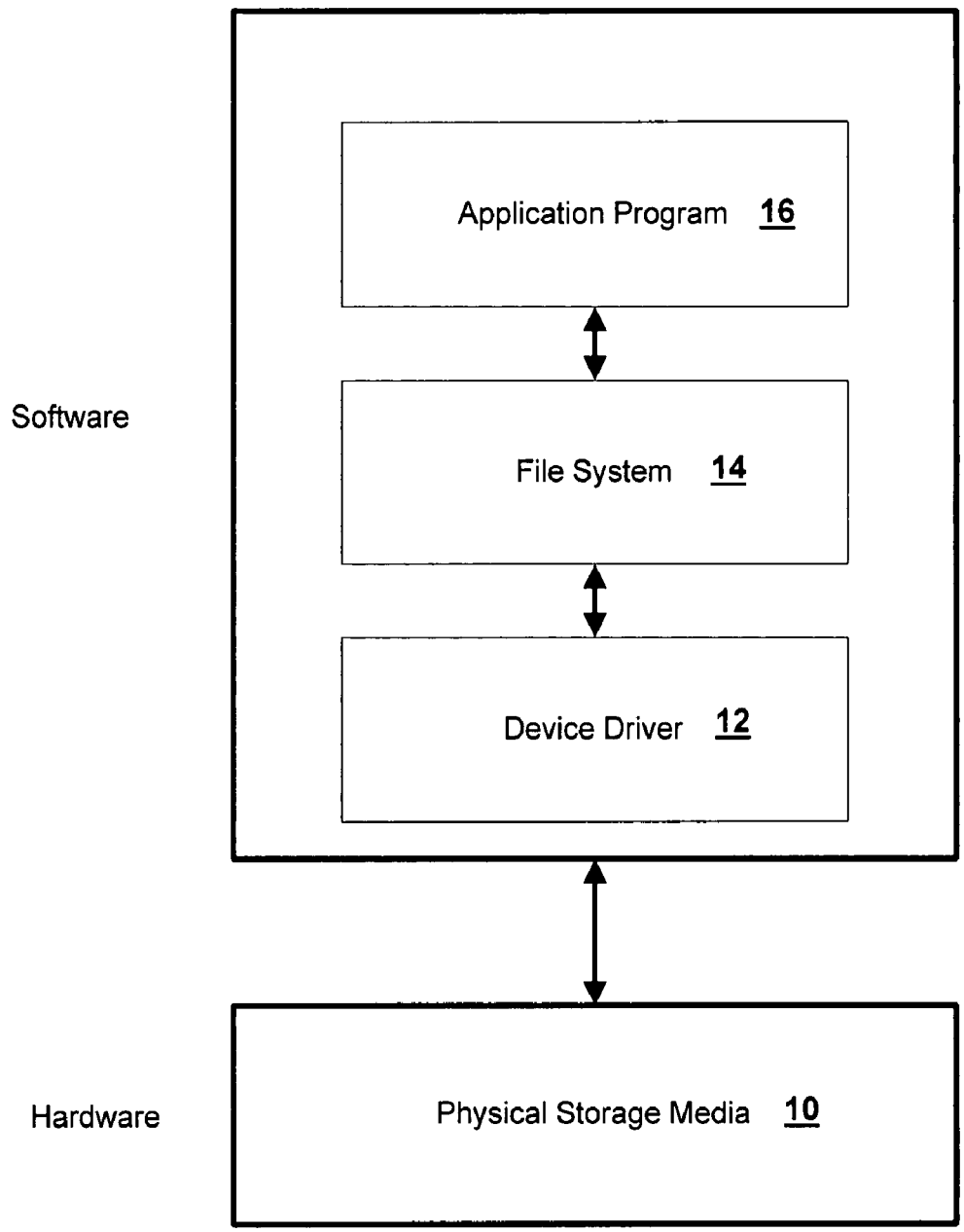
FIG. 1 illustrates how a data storage medium is accessed by software, both according to the prior art and according to the present invention.
Figure 2:
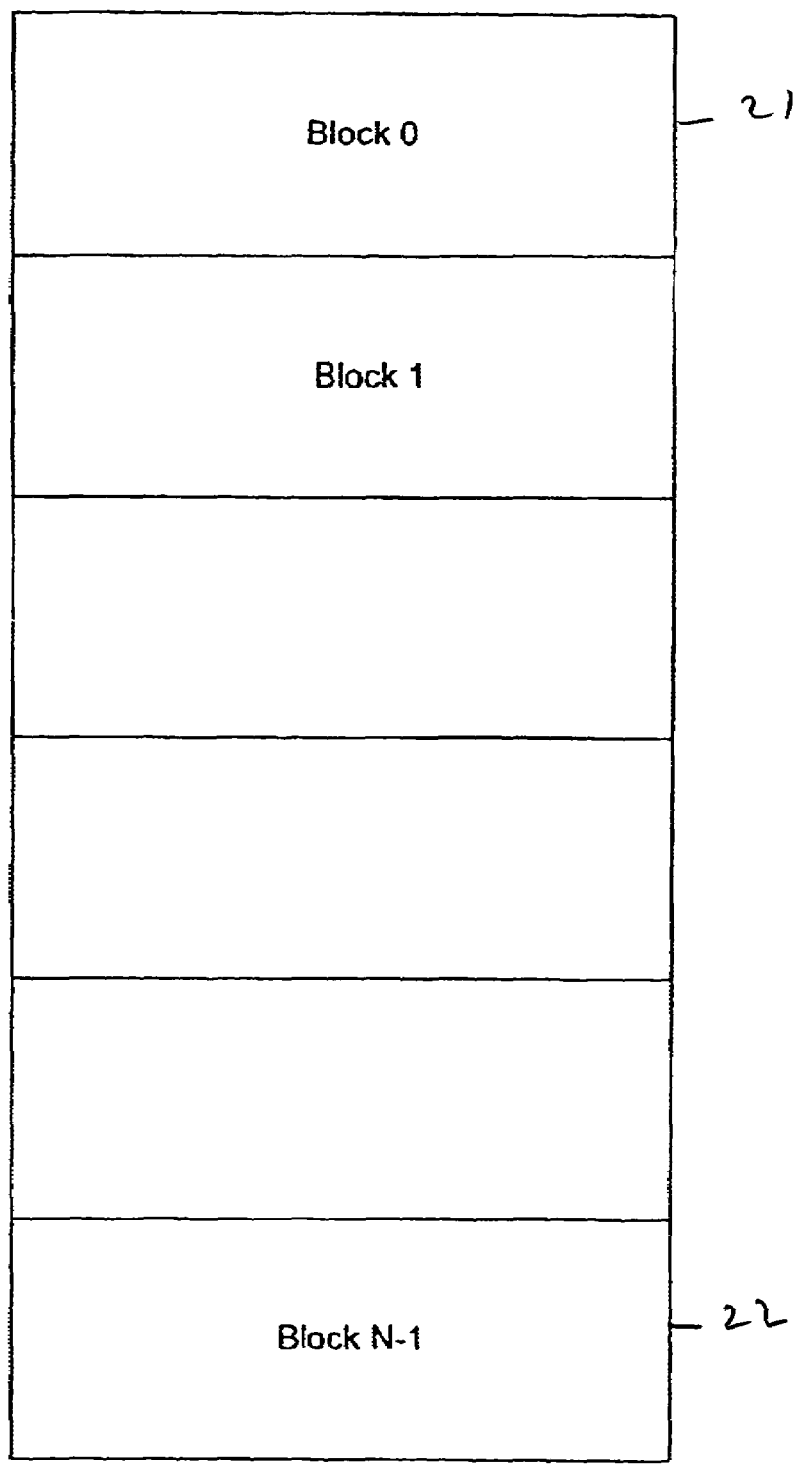
FIG. 2 shows the structure of a block device.
Figure 3:
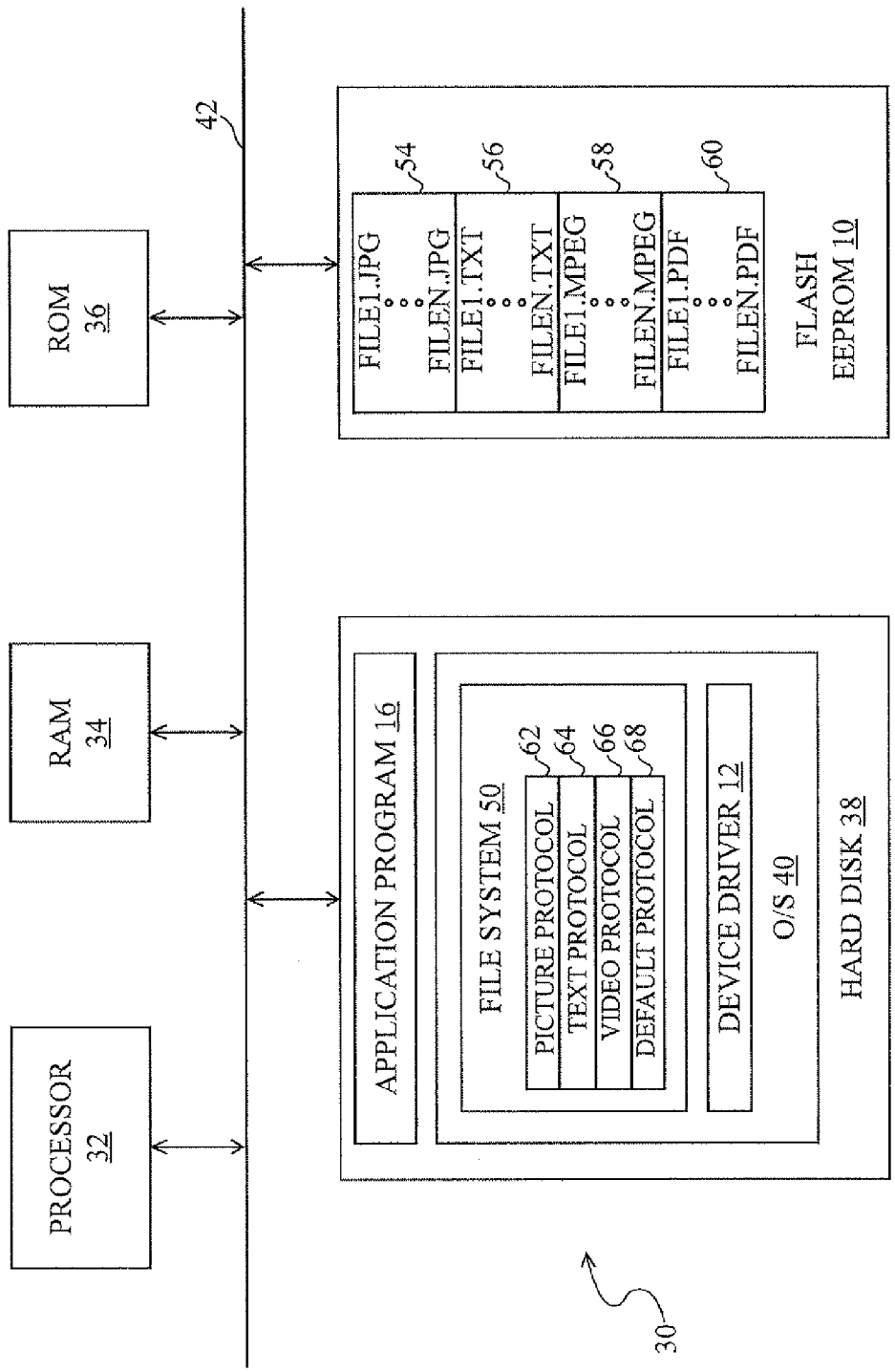
FIG. 3 is a partial high-level block diagram of a data processing device of the present invention.

FIG. 3 is a partial high-level block diagram of a data processing device 30 of the present invention. Device 30 includes a processor 32, a volatile memory (specifically, a RAM) 34 and three non-volatile memories: a ROM 36, a hard disk 38, and, serving as physical storage medium 10, a flash EEPROM. Hard disk 38 has stored thereon application programs 16 and, as part of an operating system 40, a device driver 12 for flash EEPROM 10 and a file system 50 of the present invention. Processor 32, volatile memory 34 and non-volatile memories 36, 38 and 10 communicate with each other via a bus 42. When device 30 is powered up, processor 32 runs boot code from ROM 36. One of the functions of the boot code is to load operating system 40 from hard disk 38 into RAM 34. Once operating system 40 is loaded into RAM 34, processor 32 proceeds to load one of application programs 16 into RAM 34 and to execute that application program 16. The executed application program 16 accesses files, such as picture files 54, text files 56, video files 58 and miscellaneous files 60, that are stored in flash EEPROM 10 using file system 50 of the present invention and device driver 12 as described above. In particular, file system 50 of the present invention manages some of the types of files stored in flash EEPROM 10 according to management protocols 62, 64 and 66 respective to those types, and manages the rest of the files stored in flash EEPROM 10 according to a common default protocol 68.

Hard disk 38 also represents a computer readable storage medium having embodied thereon a file system 14of the present invention.

While the invention has been described with respect to a limited number of embodiments, it will be appreciated that many variations, modifications and other applications of the invention may be made.

APPENDIX

Policy for Handling Defragmentation Based on File Type-configuration File Format

```
;===============================
;Defragmentation policy will be selected based on file extension or
 directory name.
;Defragmentation is activated automatically upon completing the following
;File System operations:
;       CloseFile
;       DeleteFile
;       RenameFile
;       CreateDirectory
;       DeleteDirectory
;       RenameDirectory
;
;Defragmentaion policy includes the following categories:
; 1. Defragmentation blocking policy:
;       a. BLOCKED- Defragmentation can be blocked by other file
system    ; operations. The defragmention will be blocked after
completing the current step ; when another file system operation is
requested.
;       b. UNBLOCKED- Defragmentation will not be blocked - any new
file system ; call will wait until it completes.
; 2. Defragmentation level policy:
;       a. NONE               - No defragmentation.
;       b. PARTIAL            - Defragmentation only of directory
                                 entries.
;       c. FULL               - Defragmentation of directory entries and
                                 data clusters.
;Default folder defragmentation policy.
;-------------------------------------
; Note: In case no policy is defined for a file extension or directory name,
;defragmentation policy will be according to the "Default Directory
Entry" policy as ;follows:
["Default Directory Entry"]
["file extension" = "*.*"]
       ["CloseFile"]
           "defragment_block" = dword:UNBLOCKED
           "defragment_level" = dword:FULL
       ["DeleteFile"]
           "defragment_block" = dword:UNBLOCKED
           "defragment_level" = dword:FULL
       ["RenameFile"]
           "defragment_block" = dword:UNBLOCKED
           "defragment_level" = dword:FULL
["Folder" = "*.*"]
       ["CreateDirectory"]
           "defragment_block" = dword:UNBLOCKED
           "defragment_level" = dword:FULL
       ["DeleteDirectory"]
           "defragment_block" = dword:UNBLOCKED
           "defragment_level" = dword:FULL
       ["RenameDirectory"]
           "defragment_block" = dword:UNBLOCKED
           "defragment_level" = dword:FULL
;Still pictures directory
;------------------------
; Assuming user cannot be tolerant to delay after capturing a
; picture, we will prefer BLOCKED defragmentaion with PARTIAL
level.
["MyPictures"]
["file extension" = "*.jpeg"]
       ["CloseFile"]
           "defragment_block" = dword:BLOCKED
           "defragment_level" = dword:PARTAIL
;Video On Demand directory
;-------------------------
; Assuming user can be tolerant to delay after capturing a few minutes of
video, we ; will prefer UNBLOCKED defragmentaion with PARTIAL
level.
["MyFilms"]
["file extension" = "*.mpeg"]
       ["CloseFile"]
           "defragment_block" = dword:UNBLOCKED
           "defragment_level" = dword:PARTAIL
;PIM Directory
;--------------
; Assuming user can be tolerant to delay after saving a contact, we prefer
;UNBLOCKED defragmentaion with FULL level.
["MyContacts"]
["file extension" = "*.pst"]
       ["CloseFile"]
```

-continued

```
"defragment_block" = dword:BLOCKED
"defragment_level" = dword:FULL
```

What is claimed is:

1. A data processing device comprising:
   (a) a memory for storing a plurality of files, each said file having a respective instance of a property of said files; and
   (b) a file system configurable:
      (i) to determine, for any one of said files, said respective instance of said any one file directly from information associated with said any one file,
      (ii) to select a respective management protocol for at least one of said instances, and
      (iii) to manage all said files of each said at least one instance according to said respective management protocol of said each instance.

2. The data processing device of claim 1, wherein said file system is configurable to manage all other said files according to a common default protocol.

3. The data processing device of claim 1, wherein said property is a type of said files.

4. The data processing device of claim 1, wherein said memory also has stored therein an application program, and wherein said file system is configurable so that when operating on said any one file on behalf of said application program, said file system determines said instance of said property of said any one file independently of said application program.

5. A computer readable storage medium having embodied thereon computer readable code of a file system, the computer readable code comprising:
   (a) program code for configuring the file system to determine, for any one of a plurality of files, a respective instance of a property of said any one file directly from information associated wit said any one file;
   (b) program code for configuring the file system to select a respective management protocol for at least one of said instances, and
   (c) program code for configuring the file system to manage all of said files of each said at least one instance according to said respective management protocol of said each instance.

6. The computer readable storage medium of claim 5, wherein the computer readable code further comprises:
   (d) program code for configuring the file system to manage all other said files according to a common default protocol.

7. The computer readable storage medium of claim 5, wherein said property is a type of said files.

8. The computer readable storage medium of claim 5, wherein said program code, for configuring the file system to determine, for said any one file, said respective instance of said property of said any one file, configures the file system to determine said respective instance independently of an application program on behalf of which said file system operates on said any one file.

9. A method of managing a plurality of files, comprising the steps of:
   (a) selecting a property of the files to use for managing the files;
   (b) for each of at least one instance of said property, selecting a respective management protocol for each file whose instance of said property is said each instance; and
   (c) configuring a file system so that when operating on any one of the files:
      (i) said file system determines said instance of said property of said any one file directly from information associated with said any one file, and
      (ii) if said instance of said property of said any one file has a respective management protocol, said file system applies said respective management protocol to said any one file; and
   (d) operating on at least one of the files, using said file system.

10. The method of claim 9, wherein said configuring is effected so that when operating on any one of the files:
    (iii) if said instance of said property of said any one file lacks a respective management protocol, said file system applies a default management protocol to said any one file.

11. The method of claim 9, wherein said property is a type of the files.

12. The method of claim 11, wherein one of said at least one instance is text, so that a respective management protocol is selected for text files.

13. The method of claim 11, wherein one of said at least one instance is audio, so that a respective management protocol is selected for audio files.

14. The method of claim 11, wherein one of said at least one instance is picture, so that a respective management protocol is selected for picture files.

15. The method of claim 11, wherein one of said at least one instance is video, so that a respective management protocol is selected for video files.

16. The method of claim 11, wherein one of said at least one instance is Web page, so that a respective management protocol is selected for Web page files.

17. The method of claim 9, wherein said protocols include respective policies that include different tradeoffs between performance and ruggedness.

18. The method of claim 9, wherein said protocols include respective policies that include different tradeoffs between average performance and latency.

19. The method of claim 9, wherein said file system determines said instance of said property of said any one file according to a filename extension of said any one file.

20. The method of claim 9, wherein said file system determines said instance of said property of said any one file according to a name of a folder that includes said any one file.

21. The method of claim 9, wherein said file system is configured at runtime.

22. The method of claim 9, wherein said file system is configured so that when operating on said any one file on behalf of an application program, said file system determines said instance of said property of said any one file independently of said application program.

* * * * *